(12) United States Patent
Okano

(10) Patent No.: US 7,062,026 B1
(45) Date of Patent: Jun. 13, 2006

(54) TELEPHONE APPARATUS AND START CONTROL METHOD

(75) Inventor: Yoichi Okano, Tokyo (JP)

(73) Assignee: NEC Corporation, Tokyo (JP)

( * ) Notice: Subject to any disclaimer, the term of this patent is extended or adjusted under 35 U.S.C. 154(b) by 388 days.

(21) Appl. No.: 09/669,847

(22) Filed: Sep. 27, 2000

(30) Foreign Application Priority Data

Sep. 27, 1999 (JP) .................................. 11/273099

(51) Int. Cl.
*H04M 3/42* (2006.01)

(52) U.S. Cl. ................................ 379/210.01; 379/207.1

(58) Field of Classification Search ................ 379/133, 379/114.09, 112.02, 128, 142, 207.03, 207.1, 379/210.01, 372–378; 455/458, 460, 556
See application file for complete search history.

(56) References Cited

U.S. PATENT DOCUMENTS

| | | | | |
|---|---|---|---|---|
| 4,405,839 A | * | 9/1983 | Groff | .......................... 379/188 |
| 4,481,382 A | * | 11/1984 | Villa-Real | ................ 455/556.1 |
| 5,625,683 A | * | 4/1997 | Nazanin et al. | ........ 379/355.06 |
| 5,822,400 A | * | 10/1998 | Smith | ...................... 379/32.02 |
| 6,477,374 B1 | * | 11/2002 | Shaffer et al. | .............. 455/445 |

FOREIGN PATENT DOCUMENTS

| | | |
|---|---|---|
| JP | 05-219174 | 8/1993 |
| JP | 06-133100 | 5/1994 |
| JP | 8-181781 | 7/1996 |
| JP | 09-247258 | 9/1997 |

OTHER PUBLICATIONS

British Search Report dated Jun. 12, 2001.

* cited by examiner

*Primary Examiner*—Wing Chan
*Assistant Examiner*—Alexander Jamal
(74) *Attorney, Agent, or Firm*—McGinn IP Law Group, PLLC

(57) ABSTRACT

An alert control method in telephone equipment allowing communication with a certain person to be ensured is disclosed. A last-communication time of day related to a name of a person to communicate with is stored in a phonebook database. It is determined whether a predetermined time interval has elapsed after the last-communication time of day without communicating with the person. When it is determined that the predetermined time interval has elapsed without communicating with the person, an audible or silent alert is made to alert the user to make a call to that person.

27 Claims, 14 Drawing Sheets

FIG. 7

110 PHONEBOOK DATABASE

| No. | PHONE NUM. | NAME | LAST-ACCESS TIME OF DAY | GROUP | BEFORE-ALERT TIME INTERVAL |
|---|---|---|---|---|---|
| 1 | 03-1234-5678 | YAMADA TARO | 1999/05/31/10:10 | CLIENT | 3 DAYS |
| 2 | 090-1192-1274 | SUZUKI ICHIRO | 1999/05/31/19:05 | FRIEND | 15 HOURS |
| 3 | 070-4416-5525 | NISHIDA HIKARI | 1999/05/31/15:22 | FRIEND | 1 MONTH |
| 4 | 045-123-4567 | SATO EISAKU | 1999/04/25/15:23 | CLIENT | NO SETTING(NO ALERT) |
| 5 | 0422-12-3456 | NISHIYAMA MITSUO | 1999/04/25/15:24 | FRIEND | NO SETTING(NO ALERT) |
| ... | ... | ... | ... | ... | ... |

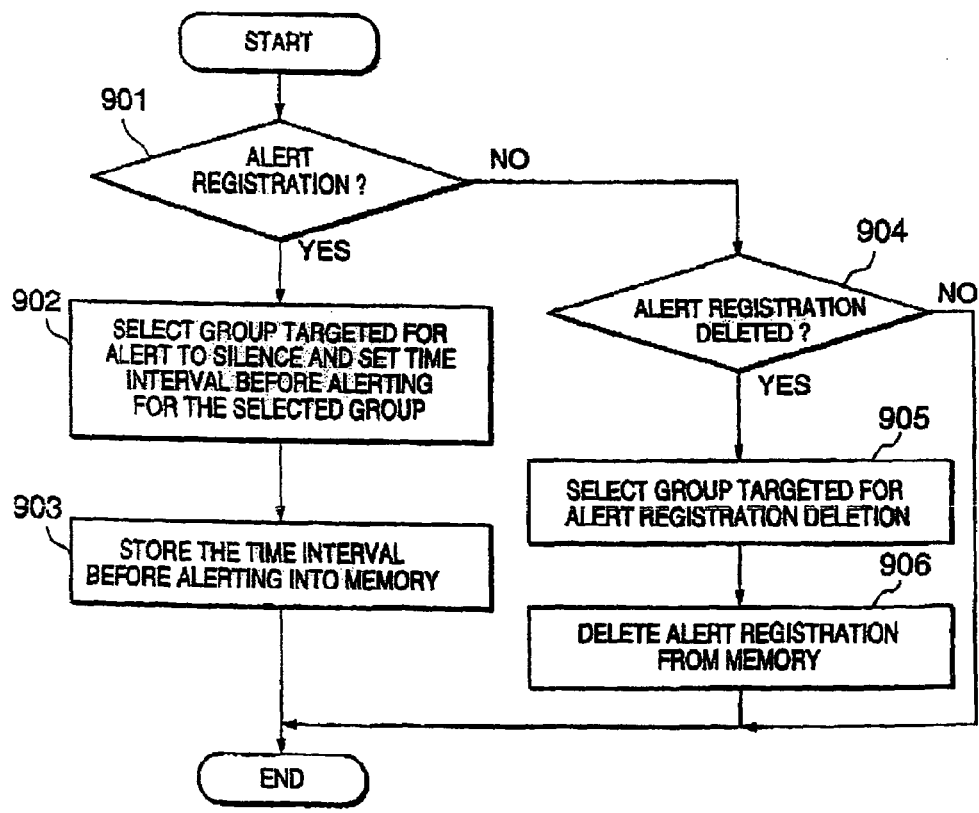

FIG. 10

110 PHONEBOOK DATABASE

| No. | PHONE NUM | NAME | LAST-ACCESS TIME OF DAY | GROUP | BEFORE-ALERT TIME INTERVAL |
|---|---|---|---|---|---|
| 1 | 03-1234-5678 | YAMADA TARO | 1999/05/31/10:10 | CLIENT | 3 DAYS |
| 2 | 090-1192-1274 | SUZUKI ICHIRO | 1999/05/31/19:05 | FRIEND | 15 HOURS |
| 3 | 070-4416-5525 | NISHIDA HIKARI | 1999/05/31/15:22 | FRIEND | 15 HOURS |
| 4 | 045-123-4567 | SATO EISAKU | 1999/04/25/15:23 | CLIENT | 3 DAYS |
| 5 | 0422-12-3456 | NISHIYAMA MITSUO | 1999/04/25/15:24 | FRIEND | 15 HOURS |
| ... | ... | ... | ... | ... | ... |

FIG. 11

| SETTING No. | ALERT-INHIBITION TIME |
|---|---|
| | ⌐ 120 ALERT-INHIBITION TIME TABLE |
| 1 | 00:00~08:00 |
| 2 | 1999/05/25/13:00~1999/05/25/17:00 |
| ⋮ | ⋮ |

| No. | PHONE NUMBER | NAME |
|---|---|---|
| 1 | 03-1234-5678 | YAMADA TARO |
| 2 | 090-1192-1274 | SUZUKI ICHIRO |
| ⋮ | ⋮ | ⋮ |

130 ALERT LIST

TELEPHONE APPARATUS AND START CONTROL METHOD

BACKGROUND OF THE INVENTION

1. Field of the Invention

The present invention generally relates to a telephone apparatus such as a portable or mobile telephone, and in particular to a telephone apparatus having a communication history memory and an alert control method thereof.

2. Description of the Related Art

There has been proposed a telephone set having a communication history memory which is used to allow a user to check the communication history that is a sequential list of the calling and called times of day and the phone numbers of the other parties thereof. Accordingly, by requesting the communication history through an input device such as a keypad, the user is notified when communication was made with a certain person.

However, when the user forgets to check the communication history, a certain person who called to the user would be left in a state that no word has been heard in reply.

In Japanese Patent Application Unexamined Publication No. 8-181781, a voice mail system using a PHS (personal-handy phone system) terminal has been disclosed, which allows the user to check the status of its mailbox without telephoning the voice mail system. More specifically, when receiving a voice mail addressed to a subscriber, a service management office transmits an incoming-call occurrence notification, the incoming-call occurrence time of day, and the caller phone number of the incoming call to the PHS terminal of the subscriber. Based on the incoming-call occurrence time of day received from the service management office, the PHS terminal determines whether a voice mail that its predetermined hold time has elapsed exists in the mailbox. If such a voice mail exists, then the PHS terminal alerts the user by audible or silent alert to the presence of such a voice mail that its predetermined hold time has elapsed.

According to this conventional voice mail system, the user can be alerted about an incoming call only. Therefore, communication with a certain person cannot be ensured sufficiently.

SUMMARY OF THE INVENTION

An object of the present invention is to provide a telephone apparatus and an alert control method allowing communication with a certain person to be ensured.

According to the present invention, when an elapsed time after the last-communication time of day with a certain person exceeds a predetermined time interval, the telephone apparatus alerts the user.

According to an aspect of the present invention, an alert control method in telephone equipment having an alert function, includes the steps of: a) storing time data related to a name of a person to communicate with in a phonebook database; b) determining based on the time data whether a predetermined time interval has elapsed without communicating with the person; and c) alerting when it is determined that the predetermined time interval has elapsed without communicating with the person. The time data may be a last-communication time of day at which communication with the person was made last.

The step (b) may include the steps of: b.1) reading a current time of day from a timer: b.2) calculating an elapsed time from the last-communication time of day to the current time of day; and b.3) determining whether the elapsed time exceeds the predetermined time interval.

The last-communication time of day may be initially set to a time of day when data related to the person is registered into the phonebook database. The last-communication time of day may be updated each time communication with the person is terminated. The predetermined time interval may be arbitrarily determined depending on a user's instruction.

The alerting of the step (c) may be performed by driving at least one of a speaker, a vibrator, and a display.

According to anther aspect of the present invention, an alert control method includes the steps of: a) storing a last-communication time of day related to a name of each of a plurality of persons to communicate with in a phonebook database; b) dividing the plurality of persons into a plurality of groups; c) determining a before-alert time interval for each of the groups, wherein the before-alert time interval is a time interval during which communication with the person is not made before alerting; d) determining whether the before-alert time interval has elapsed after the last-communication time of day; and e) alerting when it is determined that the before-alert time interval has elapsed after the last-communication time of day.

According to further another aspect of the present invention, an alert control method includes the steps of: a) storing time data related to a name of a person to communicate with in a phonebook database; b) storing an alert-inhibition time period during which alert is inhibited; c) determining based on the time data whether a predetermined time interval has elapsed without communicating with the person; d) alerting when a current time of day falls out of the alert-inhibition time period and it is determined that the predetermined time interval has elapsed without communicating with the person; and e) inhibiting alert when the current time of day falls into the alert-inhibition time period even if it is determined that the predetermined time interval has elapsed without communicating with the person.

In the step (e), an audible alert by the speaker and/or the vibrator may be inhibited and a silent alert on the display may be permitted.

According to still another aspect of the present invention, the alert control method further includes the steps of: storing an alert list containing persons targeted for alert; and displaying the alert list in form of a menu on a display so that a desired one is selected from the alert list to make a call to the desired one.

A telephone apparatus according to the present includes: a phonebook database for storing time data related to a name of a person to communicate with; and a controller for determining based on the time data whether a predetermined time interval has elapsed without communicating with the person and starting the alert function when it is determined that the predetermined time interval has elapsed without communicating with the person.

A telephone apparatus according to the present includes: a phonebook database for storing a last-communication time of day related to a name of each of a plurality of persons to communicate with, wherein the plurality of persons is divided into a plurality of groups; and a controller for determining a before-alert time interval for each of the groups, wherein the before-alert time interval is a time interval during which communication with the person is not made before alerting, determining whether the before-alert time interval has elapsed after the last-communication time of day, and starting the alert function when It is determined that the before-alert time interval has elapsed after the last-communication time of day.

A telephone apparatus according to the present includes: a phonebook database for storing time data related to a name of a person to communicate with; an alert-inhibition timetable storing an alert-inhibition time period during which alert is inhibited; and a controller for determining based on the time data whether a predetermined time interval has elapsed without communicating with the person, starting the alert function when a current time of day falls out of the alert-inhibition time period and it is determined that the predetermined time interval has elapsed without communicating with the person, and inhibiting alert when the current time of day falls into the alert-inhibition time period even if it is determined that the predetermined time interval has elapsed without communicating with the person.

As described above, according to the present invention, when an elapsed time after the last-communication time of day with a certain person exceeds a predetermined time interval, the telephone alerts the user. Therefore, in the case where the phone number of a registered person has not been used for a long time or the registered before-alert time interval, the user is alerted and thereby the communication with that person is promoted.

Further, a plurality of registered names are divided into a plurality of groups and a before-alert time interval can be set for each registration group, resulting in improved operability and enhanced convenience.

Furthermore, an alert-inhibition time period can be set to a desired time period. Therefore, beeper sound or vibration is prevented from annoying the people around the telephone in conference or in sleep.

Finally, the user is alerted and thereafter the alerting image is changed to an easy-to-call alerting image including a list of persons so as to easy make a call to a desired one of the listed persons.

BRIEF DESCRIPTION OF THE DRAWINGS

FIG. 7 is a diagram showing an example of contents of the phonebook database in the first embodiment of the present invention;

FIG. 8 is a diagram showing an example of a combination of group and before-alert time interval in the phonebook database according to a second embodiment of the present invention;

FIG. 9 is a flowchart showing an alert registration operation according to the second embodiment of the present invention;

FIG. 10 is a diagram showing an example of contents of the phonebook database in the second embodiment of the present invention;

FIG. 11 is a diagram showing an example of an alert-inhibition timetable according to a third embodiment of the present invention;

DETAILED DESCRIPTION OF THE PREFERRED EMBODIMENTS

Figure 1:
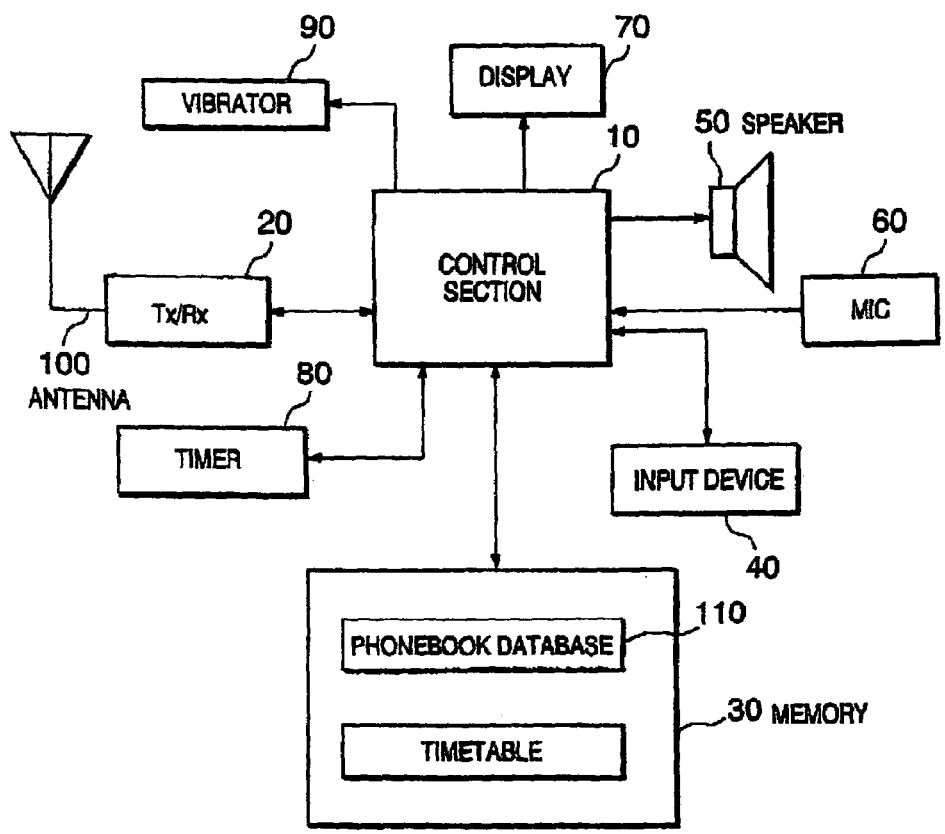
FIG. 1 is a block diagram showing a radio mobile telephone that is an embodiment of a telephone apparatus according to the present invention.

Referring to FIG. 1, there is shown a mobile telephone in accordance with the present invention. The mobile telephone is provided with a radio system 20, which transmits and receives a radio signal to and from a radio base station (not shown) under control of a control section 10. The control section 10 includes a program-controlled processor such as a central processing unit (CPU). A control program for the mobile telephone is stored in a read-only memory (not shown) and runs on the program-controlled processor of the control section 10 to control all operations of the mobile telephone including an alert control operation as described later.

The mobile telephone is further provided with a memory 30 including a phonebook (phone directory) database 110 and other timetables, which can be accessed by the control section 10. As described later, the phonebook database 110 retrievable stores a plurality of telephone numbers and related data as shown in FIG. 7.

An input device 40 such as a keypad including a ten-key is provided on the main surface of a housing of the mobile telephone. The input device 40 is used by the user to enter various instructions such as registering of a new telephone number, retrieval of a telephone number, dialing of a selected telephone number and other necessary operations.

A speaker 50 is used to generate reception voice and an audible alert for notifying the user of incoming call or for alerting the user that communication with a certain person has not been made during a preset time interval. It is the same with a vibrator 90. A microphone 60 is used to input transmission voice.

Necessary information is displayed on a display 70 under control of the control section 10. The display 70 may employ a liquid-crystal display (LCD) or light-emitting diodes (LEDs).

A timer 80 outputs a current time of day or other time data to the control section 10. The control section 10 uses time data from the timer 80 to determine the incoming-call occurrence time of day, the originating-call occurrence time of day, the communication termination time of day, a communication time, and to calculate an elapsed time after the last-communication time of day for each entry in the phonebook database 110. As described later, when an elapsed time after the last-communication time of day for a registered person exceeds a preset time interval, the control section 10 drives the speaker 50, the vibrator, or the display 70 or a combination thereof to notify the user that communication with that person has not been made during the preset time interval. This causes the user to be prevented from forgetting to get contact with that person.

First Embodiment

A first embodiment of the present invention will be described hereafter with reference to FIGS. 1–7.

Alert Registration

Figure 2:
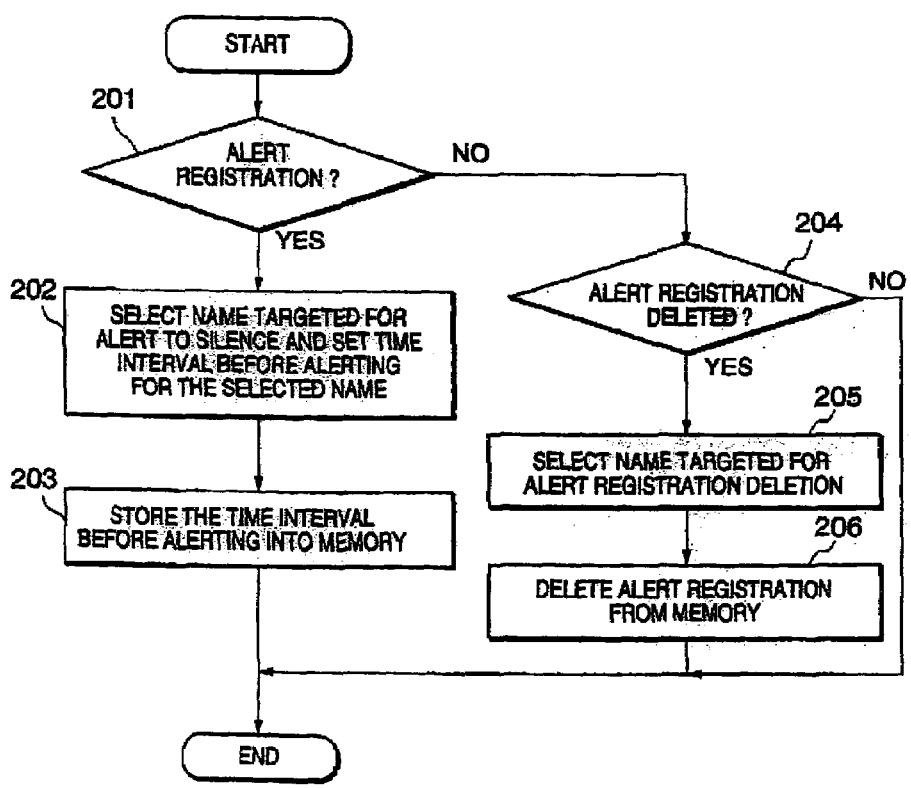
FIG. 2 is a flowchart showing an alert registration operation according to a first embodiment of the present invention.

Referring to FIG. 2, a user of the mobile telephone as shown in FIG. 1 manually operates the input device 40 to enter an alert registration request. The control section 10 monitors the input device 40 to determine whether the alert registration is requested (step 201). If it is determined that the alert registration is requested (YES at step 201), the control section 10 prompts on the display 70 the user to select a name targeted for alert to silence and enter a time interval before alerting. When the user selects the name and enters the before-alert time interval (step 202), the control section 10 searches the phonebook database 110 for the selected name and associates the before-alert time interval with information related to the selected name to store it into the phonebook database 110 as shown in FIG. 7 (step 203).

If it is determined that the alert registration is not requested (NO at step 201), the control section 10 further determines whether the user requests to delete an existing alert registration (step 204). When alert registration deletion is requested (YES at step 204), the control section 10 prompts the user on the display 70 to enter a name targeted for alert registration deletion. When the user uses the input device 40 to select the name targeted for alert registration deletion (step 205), the control section 10 searches the phonebook database 110 for the selected name and resets the alert registration associated with the selected name to "no setting" to delete the alert registration (step 206). When alert registration deletion is not requested (NO at step 204), the alert registration is terminated without any change to the phonebook database 110.

Taking as an example the case where "Yamada Taro" registered in the phonebook database 110 is set to alert registration such that alert is made after three days of silence (see FIG. 7). The user selects the alert registration at the step 201 and selects "Yamada Taro" as a person targeted for alert registration and enters "three days" as the before-alert time interval at step 202. The control section 10 searches the phonebook database 110 for the selected name "Yamada Taro" and associates the before-alert time interval "three days" with information related to the selected name "Yamada Taro" to store it into the phonebook database 110 as shown in FIG. 7.

Taking as an example the case where "Sato Eisaku" registered in the phonebook database 110 is set to alert registration deletion. The user uses the input device 40 to select the name "Sato Eisaku" targeted for alert registration deletion at step 205. The control section 10 searches the phonebook database 110 for the selected name "Sato Eisaku" and resets the alert registration associated with the selected name "Sato Eisaku" to "no settings" to delete the alert registration at step 206.

Alert Control

Figure 3:
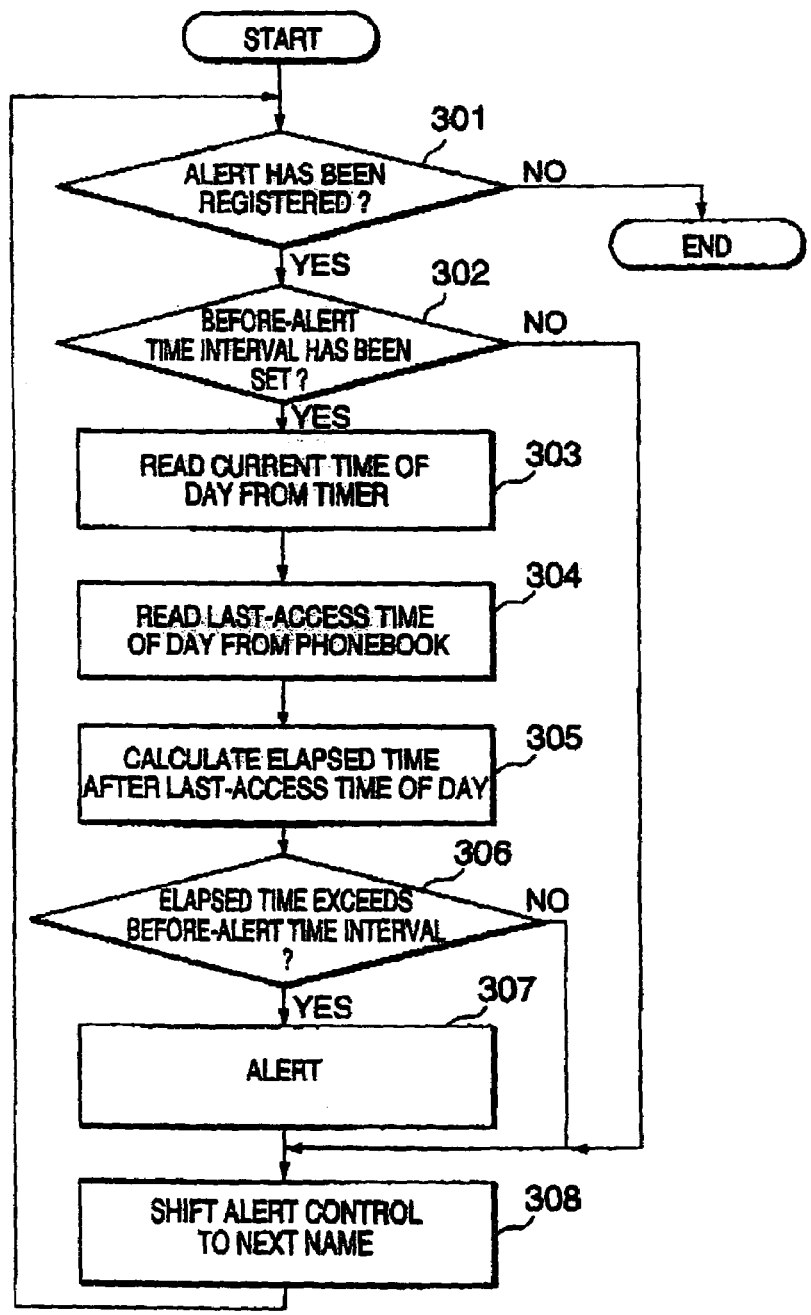
FIG. 3 is a flowchart showing an alert control operation according to the first embodiment of the present invention.

Referring to FIG. 3, the control section 10 determines whether alert to silence has been already registered (step 301). If no alert to silence is registered (NO at step 301), the alert control is completed.

When the alert to silence has been already registered (YES at step 301), the control section 10 sequentially checks entries in the phonebook database 110 to determine whether the before-alert time interval has been set (step 302). If the before-alert time interval of an entry has been reset to "No settings" (NO at step 302), the control section 10 shifts the alert control to the next entry (step 308).

If the before-alert time interval of an entry has been set (YES at step 302), then the control section 10 reads the current time of day from the timer 80 (step 303). Thereafter, the control section 10 reads the last-access time of day when last communicated with the person of a selected entry from the phonebook database 110 (step 304). Then, the control section 10 calculates the time period of silence elapsed after the last-access time of day (step 305) and determines whether the elapsed time exceeds the before-alert time interval that has been set (step 306).

If the elapsed time exceeds the before-alert time interval (YES at step 306), the control section 10 alerts the user that the before-alert time interval of silence has elapsed by displaying alert information on the display 70 and driving the speaker or the vibrator (step 307). Thereafter, the control section 10 shifts the alert control to the next entry (step 308) and repeatedly performs the steps 301–308 until all entries have been checked.

Taking as an example the case where the before-alert time interval of "Suzuki Ichiro" has been set to 15 hours (see FIG. 7). When having selected the entry of "Suzuki Ichiro", the control section 10 reads the current time of day from the timer 80 at step 303. Here, it is assumed that the current time of day is 1999/06/01/10:06, that is, 10:06, Jun. 1$^{st}$, 1999. Thereafter, the control section 10 reads the last-access time of day with "Suzuki Ichiro" from the phonebook database 110 at step 304. Here, the last-access time of day with "Suzuki Ichiro" is 1999/05/31/19:05. Therefore, the time period of silence elapsed after the last-access time of day is 15 hours and 1 minute. The control section 10 determines that the time period of silence exceeds the before-alert time interval of 15 hours at step 306. Therefore, the control section 10 alerts the user by displaying alert information on the display 70 and driving the speaker or the vibrator at step 307.

Data Entry

Figure 4:
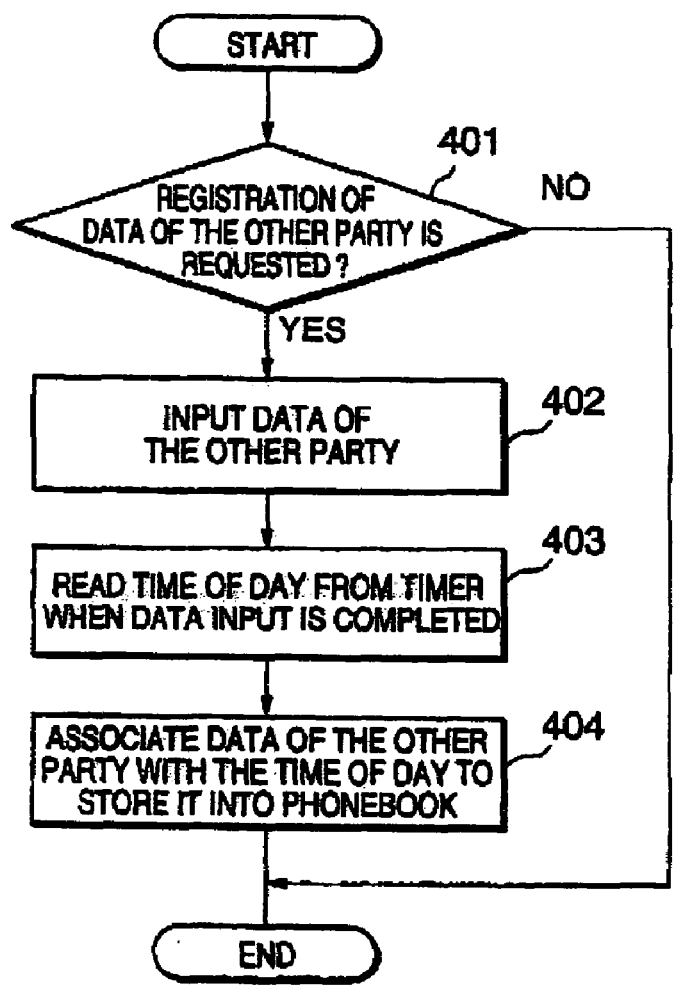
FIG. 4 is a flowchart showing an operation of registering data of the other party into a phonebook database in the first embodiment of the present invention.

Referring to FIG. 4, when registration of data of a person to communicate with is requested (YES at step 401), the control section 10 prompts the user to enter necessary data of the person to communicate with. When the necessary data including at least the name and phone number of the person has been entered by the user operating the input device 40 (step 402), the control section 10 reads the current time of day from the timer 80 (step 403). Then, the control section 10 associates the entered data of the person with the time of day read from the timer 80 when the necessary data has been entered by the user and stores these data Into the phonebook database 110 (step 404).

When the before-alert time interval has not been entered at the step 402, the before-alert time interval of the person in the phonebook database 110 is set to "No setting".

For example, in the case where phone number "070-4416-5525", the name "Nishida Hikari" and the before-alert time interval "1 month (30 days)" are entered into the phonebook database 110 at 15:22, May 25, 1999, the data of "Nishida Hikari" is stored in the phonebook database 110 as shown by the third entry (No. 3) of FIG. 7.

Update of Last-Access Time of Day

The update operation of the last-access time interval in the case where the user originates a call to the other party will be described hereafter. It should be noted that the update operation is not performed when the before-alert time interval is set to "No settings".

Figure 5:
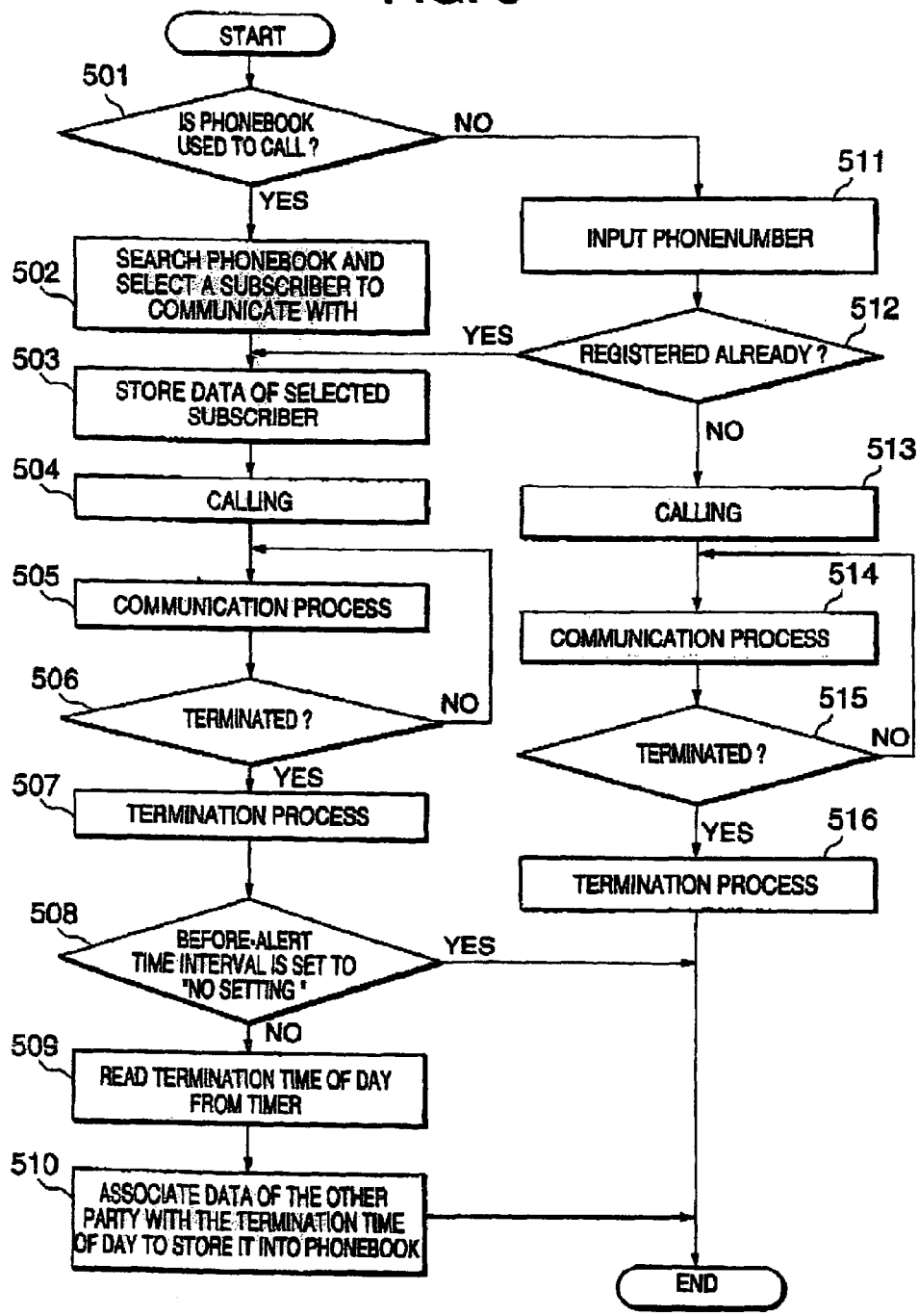
FIG. 5 is a flowchart showing an operation of updating the last-access time of day to the other party when the telephone originates a call in the first embodiment of the present invention.

Referring to FIG. 5, the control section 10 determines whether the phonebook database 110 is used to make a call (step 501). In the case where the user selects the phonebook database 110 to make a call (YES at step 501), the control section 10 prompts the user to search the phonebook database 110 for a person to be called. When the user selects a person to be called and enters a calling instruction (step 502), the control section 10 stores the data of the selected person to be called into the memory 30 so as to perform a radial function or the like (step 503). Thereafter, the control section 10 performs calling control (step 504) and communication control (step 505). The communication operation is kept (NO at step 506) until the communication is terminated.

When the communication is terminated by one of the calling party and the other party (YES at step 506), the control section 10 performs a termination operation (step 507). Then, the control section 10 determines whether the before-alert time interval of the other party is set to "No setting" (step 508). When the before-alert time interval of the other party is not set to "No settings" (NO at step 508), the control section 10 reads the time of day at which the communication is terminated from the timer 80 (step 509). Thereafter, the control section 10 associates the data of the other party with the termination time of day read from the timer 80 and stores these data into the entry of the other party of the phonebook database 110 (step 510). In other words, the old access time of day is replaced with the new access time of day that has been just read from the timer 80. In this way, the last-access time of day for the other party is updated.

In the case where the user does not use the phonebook database 110 (NO at step 501), the control section 10 prompts the user to enter the phone number of a person to be called. When the user enters the phone number through the input device 40 (step 511), the control section 10 searches the phonebook database 110 to determine whether the entered phone number has been already registered in the phonebook database 110 (step 512). If already registered (YES at step 512), the control goes to the step 503 to store the data of the person into the memory 30. Thereafter, the steps 504–510 are performed as described above.

When the entered phone number is not registered in the phonebook database 110 (NO at step 512), the control section 10 performs the calling control (step 513) and the communication control (step 514). The communication operation is kept (NO at step 515) until the communication is terminated. When the communication is terminated by one of the calling party and the other party (YES at step 515), the control section 10 performs a termination operation (step 516) without updating the last-access time of day. As described before, when the before-alert time interval of the other party is set to "No setting" (YES at step 508), the control section 10 terminates the process without updating the last-access time of day.

Next, the update operation of the last-access time interval in the case where the user takes the call from the other party will be described hereafter. It should be noted that the update operation is not performed when the before-alert time interval of the other party is set to "No setting".

Figure 6:
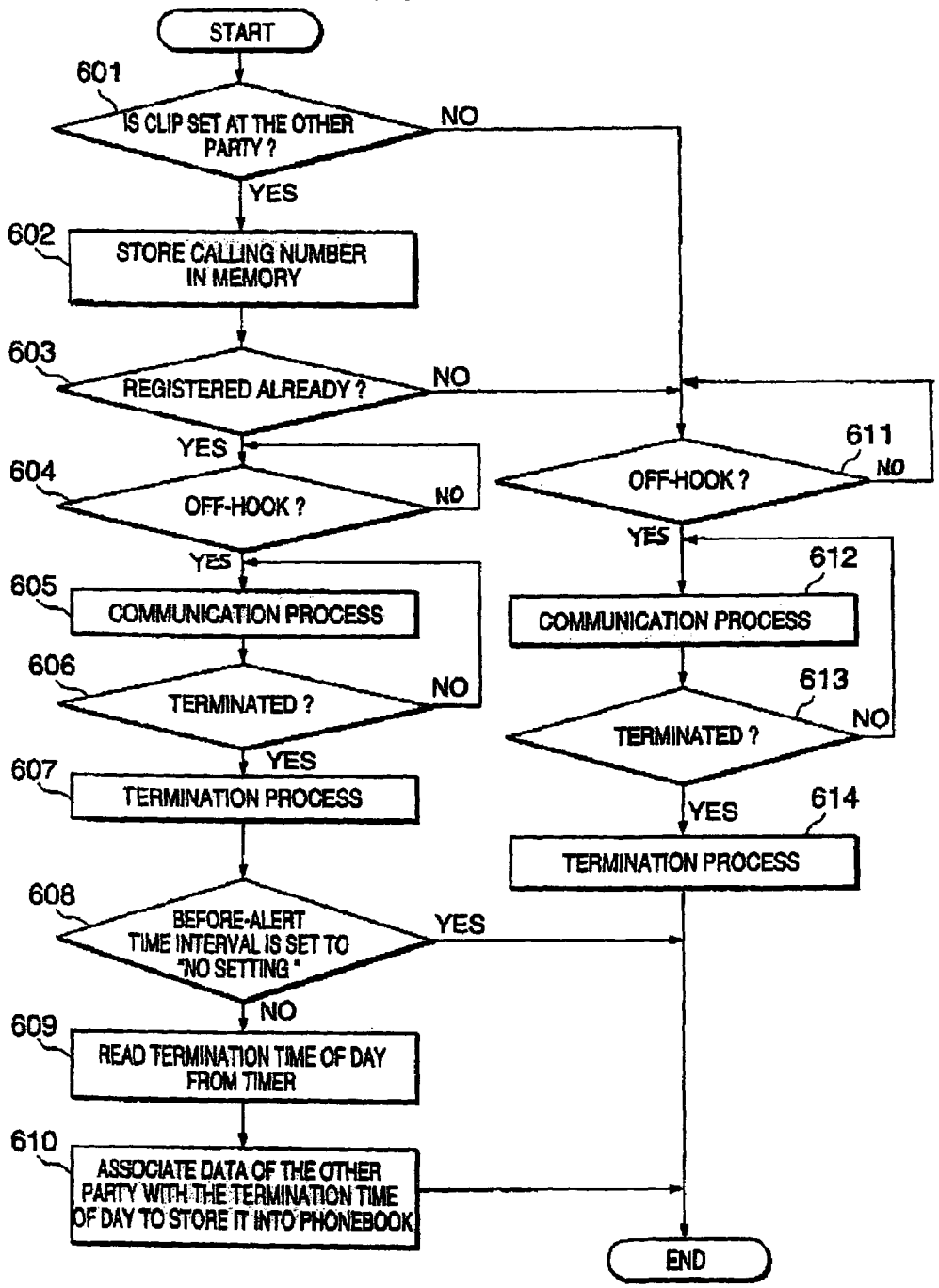
FIG. 6 is a flowchart showing an operation of updating the last-access time of day to the other party when the telephone takes an incoming call in the first embodiment of the present invention.

Referring to FIG. 6, the control section 10 determines whether CLIP (Calling Line Identification Presentation) function has been set at the other party (step 601). In the case where CLIP function has been set at the other party (YES at step 601), the control section 10 detects the calling number of the other party and stores it into the memory 30 (step 602). Then, the control section 10 searches the phonebook database 110 to determine whether the calling number of the other party has been already registered therein (step 603).

When the calling number of the other party has been already registered in the phonebook database 110 (YES at step 603), the control section 10 further determines whether the user takes the call (off-hook) (step 604). When the user takes the call (YES at step 604), the control section 10 performs calling control (step 605) and communication control (step 606). The communication operation is kept (NO at step 606) until the communication is terminated.

When the communication is terminated by one of the calling party and the other party (YES at step 606), the control section 10 performs a termination operation (step 607). Then, the control section 10 determines whether the before-alert time interval of the other party is set to "No setting" (step 608). When the before-alert time interval of the other party is not set to "No setting" (No at step 608), the control section 10 reads the time of day at which the communication is terminated from the timer 80 (step 609). Thereafter, the control section 10 associates the data of the other party with the termination time of day read from the timer 80 and stores these data into the entry of the other party of the phonebook database 110 (step 610). In other words, the old access time of day is replaced with the new access time of day that has been just read from the timer 80. In this way, the last-access time of day for the other party is updated.

When CLIP function is not set at the other party (NO at step 601) or when the calling number of the other party is not registered in the phonebook database 110 (NO at step 603), the control section 10 further determines whether the user takes the call (off-hook) (step 611). When the user takes the call (YES at step 611), the control section 10 performs calling control (step 612) and communication control (step 613). The communication operation is kept (NO at step 613) until the communication is terminated. When the communication is terminated by one of the calling party and the other party (YES at step 613), the control section 10 performs a termination operation (step 614) without updating the last-access time of day. As described before, when the before-alert time interval of the other party is set to "No setting" (YES at step 608), the control section 10 terminates the process without updating the last-access time of day.

As described above, according to the first embodiment, when the phone number of a registered person has not been used for the registered before-alert time interval or more, the user is alerted and thereby the communication with that person is promoted.

Second Embodiment

An alert control method according to a second embodiment of the present invention allows a before-alert time interval to be set for each registration group.

As shown in FIG. 8, for example, in the case of a group being "Client", the before-alert time interval is automatically set to "three days". In the case of a group being "Friend", the before-alert time interval is automatically set to "15 hours".

Referring to FIG. 9, a user of the mobile telephone as shown in FIG. 1 manually operates the input device 40 to enter an alert registration request. The control section 10 monitors the input device 40 to determine whether the alert registration is requested (step 901). If it is determined that the alert registration is requested (YES at step 901), the control section 10 prompts on the display 70 the user to select a group targeted for alert to silence and enter a time interval before alerting. When the user selects the group and enters the before-alert time interval (step 902), the control section 10 searches the phonebook database 110 for entries belonging to the selected group and replaces the before-alert time interval for each entry belonging to the selected group with the new one and store it into the phonebook database 110 as shown in FIG. 8 (step 903).

If it is determined that the alert registration is not requested (NO at step 901), the control section 10 further determines whether the user requests to delete an existing alert registration (step 904). When alert registration deletion is requested (YES at step 904), the control section 10 prompts the user on the display 70 to enter a group targeted for alert registration deletion. When the user uses the input device 40 to select the group targeted for alert registration deletion (step 905), the control section 10 searches the phonebook database 110 for the selected group and resets the alert registration associated with the selected group to "no setting" to delete the alert registration (step 906). When alert registration deletion is not requested (NO at step 904), the alert registration is terminated without any change to the phonebook database 110.

As shown in FIG. 10, for example, the user enters data such that the before-alert time interval of the group "Client" is set to "three days" and the before-alert time interval of the group "Friend" is set to "15 hours", the control section 10 automatically replaces the before-alert time interval of the entries belonging to group "Client" with "three days" and the before-alert time interval of the entries belonging to group "Friend" with "15 hours".

Third Embodiment

An alert control method according to a third embodiment of the present invention allows an alert-inhibition time period to be set so as to prevent beeper sound or vibration from annoying the people around the telephone in conference or in sleep.

As shown in FIG. 11, an alert-inhibition time period during which alert is inhibited can be registered in an alert-inhibition timetable 120 that is provided in the memory 30. For example, as shown by the setting No. 1, the alert-inhibition time period is set to the same time period 00:00 to 08:00 every day. Further, as shown by the setting No. 2, the alert-inhibition time period may be arbitrary set to a time period from a user-designated time of day to another user-designated time of day.

Alert Control

Figure 12:
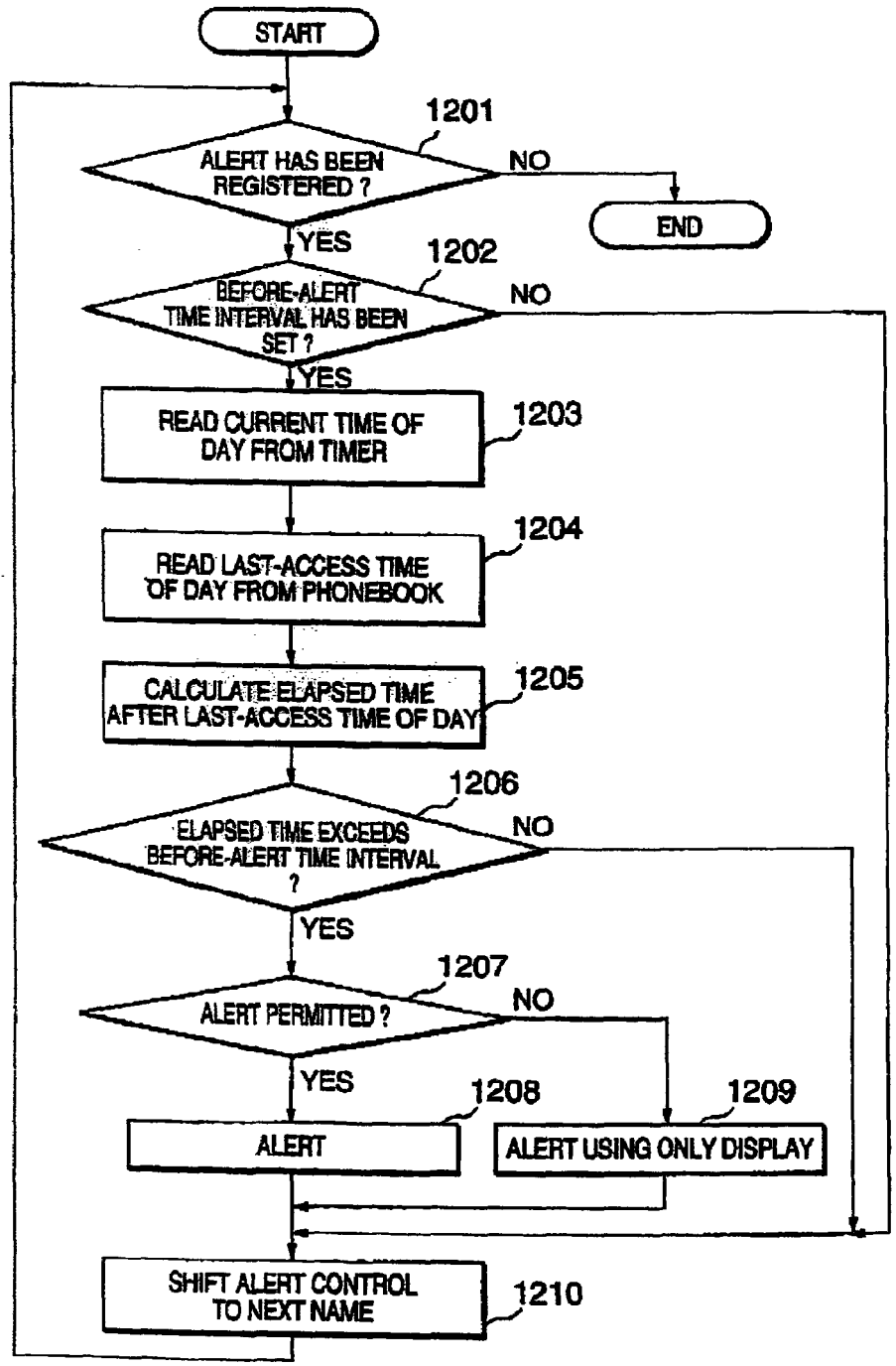
FIG. 12 is a flowchart showing an alert control operation according to the third embodiment of the present invention.

Referring to FIG. 12, the control section 10 determines whether alert to silence has been already registered (step 1201). If no alert to silence is registered (NO at step 1201), the alert control is completed.

When the alert to silence has been already registered (YES at step 1201), the control section 10 sequentially checks entries in the phonebook database 110 to determine whether the before-alert time interval has been set (step 1202). If the before-alert time interval of an entry has been reset to "NO setting" (No at step 1202), the control section 10 shifts the alert control to the next entry (step 1210).

If the before-alert time interval of an entry has been set (YES at step 1202), then the control section 10 reads the current time of day from the timer 80 (step 1203). Thereafter, the control section 10 reads the last-access time of day when last communicated with the person of a selected entry from the phonebook database 110 (step 1203). Then, the control section 10 calculates the time period of silence elapsed after the last-access time of day (step 1205) and determines whether the elapsed time exceeds the before-alert time interval that has been set (step 1206).

If the elapsed time exceeds the before-alert time interval (YES at step 1206), the control section 10 further determines from the alert-inhibition timetable 120 whether the current time of day falls into an alert permitted time period (step 1207). When it is permitted (YES at step 1207), the control section 10 alerts the user that the before-alert time interval of silence has elapsed by displaying alert information on the display 70 and driving the speaker or the vibrator (step 1208). When it is inhibited (NO at step 1207), the control section 10 alerts the user by only displaying alert information on the display 70 (step 1209). Thereafter, the control section 10 shifts the alert control to the next entry (step 1210) and repeatedly performs the steps 1201–1209 until all entries have been checked.

Assuming that the alert-inhibition time period is set to the time period from 00:00 to 08:00 every day as the setting No. 1 of FIG. 11 and the current time is "07:00", It is determined that the current time falls into the alert-inhibition time period (step 1207). Therefore, the user is alerted by only displaying alert information on the display 70 (step 1209).

The alert-inhibition time period is registered into the alert-inhibition timetable 120 as described hereafter.

Figure 13:
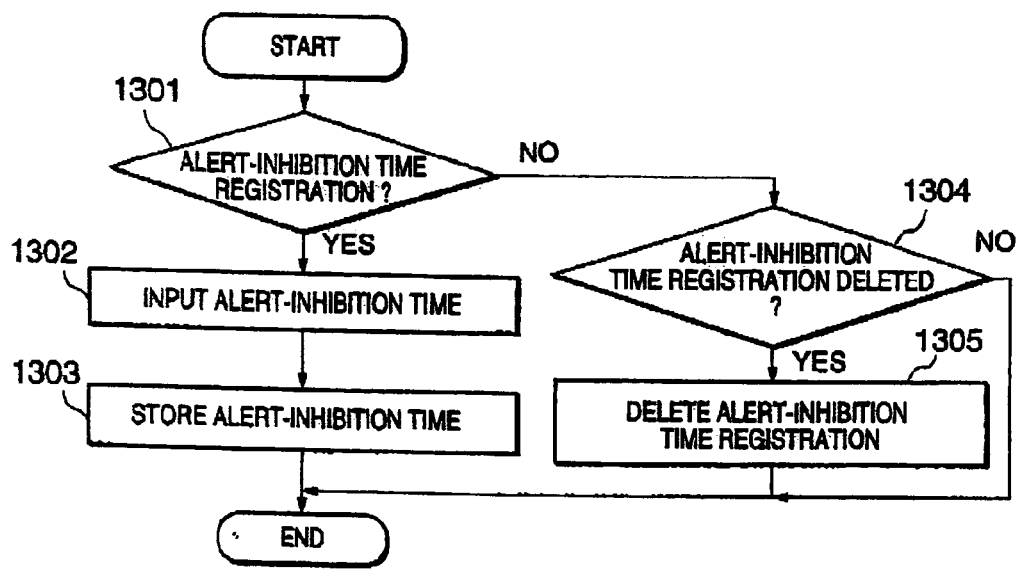
FIG. 13 is a diagram showing an operation of setting alert-inhibition time periods according to the third embodiment of the present invention.

Referring to FIG. 13, the control section 10 determines whether the alert-inhibition time registration is requested (step 1301). If it is determined that the alert-inhibition time registration is requested (YES at step 1301), the control section 10 prompts on the display 70 the user to enter the alert-inhibition time period. When the user enters the alert-inhibition time period (step 1302), the control section 10 stores it into the alert-inhibition timetable 120 as shown in FIG. 11 (step 1303).

As necessary, a plurality of alert-inhibition time periods may be registered. In this case, the user designates active one of the registered alert-inhibition time periods.

If it is determined that the alert-inhibition time registration is not requested (NO at step 1301), the control section 10 further determines whether the user requests to delete an existing alert-inhibition time registration (step 1304). When alert-inhibition registration deletion is requested (YES at step 1304), the control section 10 prompts the user on the display 70 to select an existing alert-inhibition time period to be deleted. When the user selects an alert-inhibition time period, the control section 10 deletes the selected alert-inhibition time period from the alert-inhibition timetable 120 (step 1305).

Fourth Embodiment

According to a fourth embodiment of the present invention, the user is alerted by displaying alert information on the display 70 and/or driving the speaker 50 or the vibrator 90 and thereafter the alerting image is changed to an easy-to-call alerting image.

Figure 14:
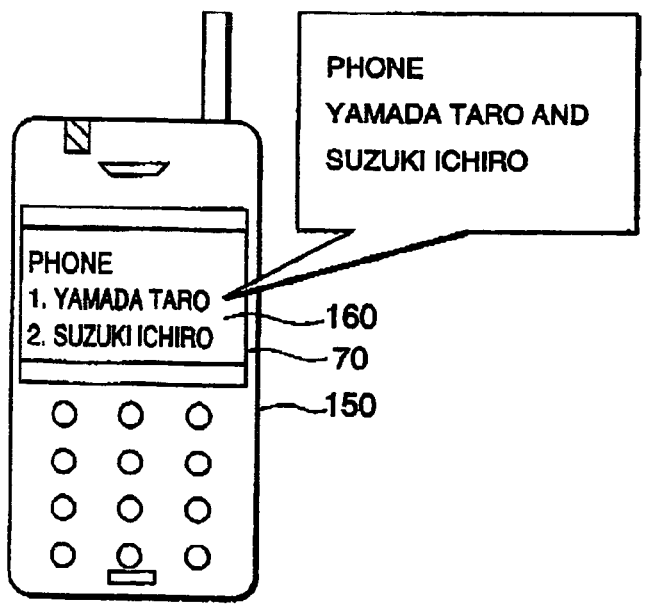
FIG. 14 is a diagram showing an example of a displayed alert image according to the first to third embodiments of the present invention.

As shown in FIG. 14, more specifically, an alerting image 160 is displayed on the display 70 provided in the housing 150 of the mobile telephone. Thereafter, as shown in FIG. 15, an easy-to-call alerting image is displayed such that the user easily makes a call to a desired one selected from a list of persons each exceeding the preset before-alert time intervals.

Figures 15, 16:
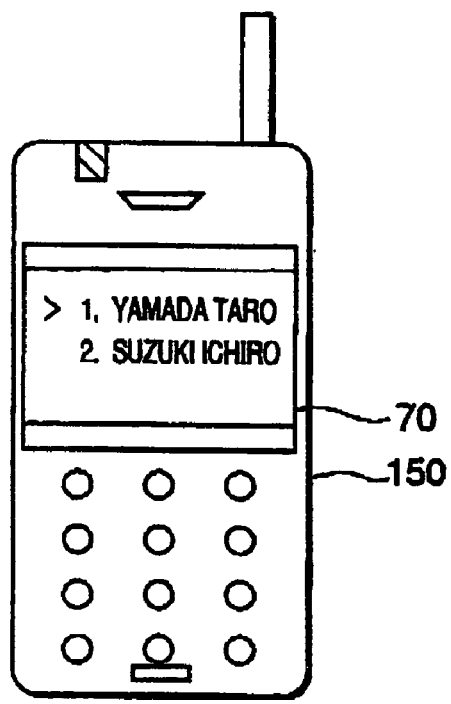
FIG. 15 is a diagram showing an example of a displayed menu of registered persons to communicate with according to the first to third embodiments of the present invention.
FIG. 16 is a diagram showing an example of an alert list according to a fourth embodiment of the present invention.

Referring to FIG. 16, after alerting, the control section 10 creates an alert list 130 in the memory 30, the alert list 130 containing at least phone numbers and names of the persons each exceeding the preset before-alert time intervals. This easy-to-call alerting image is maintained on screen until the user makes a call to one of the listed persons.

Figure 17:
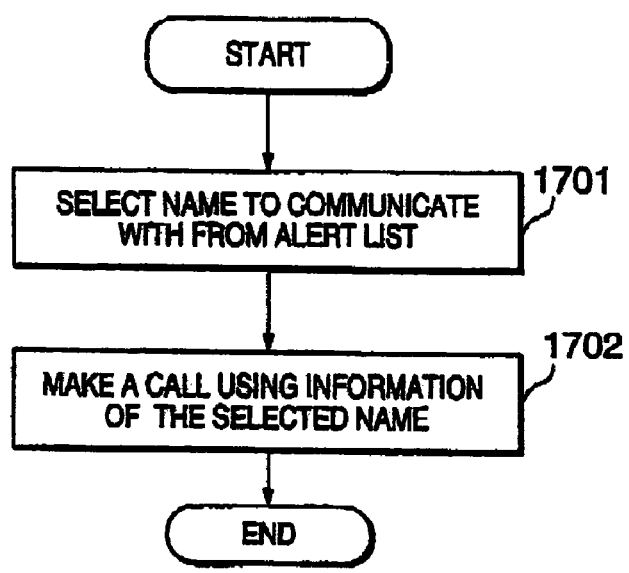
FIG. 17 is a flowchart showing a calling operation using the alert list according to the fourth embodiment of the present invention.

Referring to FIG. 17, when the easy-to-call alerting image is displayed on the display 70, the user selects a person to communicate with from the alert list displayed (step 1701). Then, the control section 10 reads the phone number of the selected person from the alert list 130 and performs the calling and communication control operation (step 1702).

In this manner, the user looks at the easy-to-call alerting image on the display 70 and selects a person to communicate with from the alert list displayed to make a call. Therefore, communication with a person exceeding the preset before-alert time intervals can be promoted.

It is to be understood that the present invention is not limited to the above-described embodiments and changes and variations may be made without departing from the spirit of scope of the following claims.

The invention claimed is:

1. An alert control method in a mobile telephone equipment having an alert function, comprising:
   registering a name of a person in a phonebook database in said mobile telephone equipment by inputting and storing a predetermined time interval associated with said person;
   storing a last-communication time related to said name of said person in said phonebook database in said mobile telephone equipment immediately after the termination of a telephone call to or from said person with said mobile telephone equipment;
   continuously performing the following process:
      checking to see if said person's name has been registered for alert;
      reading a current time of day from a timer;
      reading the most recently stored last-communication time for said person;
      calculating an elapsed amount of time value that has passed since said last-communication time;
      making a determination that said elapsed amount of time that has passed is greater than or less than said predetermined time interval based upon a comparison of the elapsed amount of time value and said predetermined time interval; and
   alerting the user of said mobile telephone equipment based uopn the determination that said elapsed amount of time that has passed is greater than said predetermined time interval.

2. The alert control method according to claim 1, wherein said last-communication time is initially set to a time when data related to the person is registered into the phonebook database.

3. The alert control method according to claim 1, wherein said last-communication time is updated each time communication with the person is terminated.

4. The alert control method according to claim 1, wherein the predetermined time interval is arbitrarily determined depending on a user's instruction.

5. The alert control method according to claim 1, wherein the alerting is performed by driving at least one of a speaker, a vibrator, and a display.

6. An alert control method in a mobile telephone equipment having an alert function, comprising:
   registering a name of a person in a phonebook database in said mobile telephone equipment by inputting and storing a predetermined time interval associated with at least one of a plurality of persons;
   storing a last-communication time related to said name in said mobile telephone equipment immediately after the termination of a telephone call to or from said at least one of a plurality of persons with said mobile telephone equipment;
   dividing the plurality of persons into at least one group;
   determining a before-alert time interval for each of the at least one group, wherein the before-alert time interval is a time interval during which communication with a person in a group is not made before alerting;
   continuously performing the following process:
      checking to see if said at least one of a plurality of persons has been registered for an alert;
      reading a current time of day from a timer;
      reading the most recently stored last-communication time for said at least one of a plurality of persons;
      calculating an elapsed amount of time value that has passed since said last-communication time;
      making a determination that said elapsed amount of time value that has passed is greater than or less than said before-alert time interval based upon a comparison of the elapsed amount of time value and said before-alert time interval; and
   alerting the user of said mobile telephone equipment based upon the determination that said elapsed amount of time value that has passed is greater than said before-alert time interval.

7. The alert control method according to claim 6, wherein the last-communication time is initially set to a time when data related to the person is registered into the phonebook database.

8. The alert control method according to claim 6, wherein the last-communication time is updated each time a communication with the person is terminated.

9. An alert control method in a mobile telephone equipment having an alert function, comprising:
   registering a name of a person in a phonebook database in said mobile telephone equipment by inputting and storing a predetermined time interval associated with said person;
   storing a last-communication time related to said name of said person in a phonebook database in said mobile telephone equipment immediately after the termination of a telephone call to or from said person with said mobile telephone equipment;
   storing an alert-inhibition time period during which alert is inhibited;
   continuously performing the following process:
      checking to see if said person's name has been registered for an alert;
      reading a current time of day from a timer;
      reading the most recently stored last-communication time for said person;
      calculating an elapsed amount of time value that has passed since said last-communication time;
      making a determination that said elapsed amount of time value that has passed is greater than or less than said alert-inhibition time period based upon a comparison of the elapsed amount of time value and said alert-inhibition time period;

alerting the user of said mobile telephone equipment based upon the determination that said elapsed amount of time value that has passed is greater than said alert-inhibition time period.

10. The alert control method according to claim 9, wherein the alerting is performed by driving at least one of a speaker, a vibrator, and a display.

11. The alert control method according to claim 10, wherein inhibiting comprises an audible alert by the speaker and/or the vibrator is inhibited and a silent alert on the display is permitted.

12. The alert control method according to claim 1, further comprising:
    storing an alert list containing persons targeted for alert; and
    displaying the alert list in a form of a menu on a display so that a desired one can be selected from the alert list to make a call to the desired one.

13. The alert control method according to claim 6, further comprising:
    storing an alert list containing persons targeted for alert; and
    displaying the alert list in a form of a menu on a display so that a desired one can be selected from the alert list to make a call to the desired one.

14. The alert control method according to claim 9, further comprising:
    storing an alert list containing persons targeted for alert; and
    displaying the alert list in a form of a menu on a display so that a desired one can be selected from the alert list to make a call to the desired one.

15. A mobile telephone apparatus having an alert function, said apparatus comprising:
    a phonebook database in said mobile telephone apparatus for storing a name of a person and a predetermined time interval associated with said person and a last-communication time related to said name of said person, said last communication time being stored immediately after the termination of a telephone call to or from said person with said mobile telephone equipment; and
    a controller for continuously preforming the following process:
        checking to see if said person's name has been registered for an alert;
        reading a current time of day from a timer;
        reading the mot recently stored last-communication time for said person;
        calculating an elapsed amount of time value that has passed since said last-communication time;
        making a determination that said elapsed amount of time that has passed is greater than or less than said predetermined time interval based upon a comparison of the elapsed amount ot time value and said predetermined time interval; and
        starting the alert function to alert the user of said mobile telephone equipment based upon the determination that said elapsed amount of time that has passed is greater than said predetermined time interval.

16. A mobile telephone apparatus having an alert function, comprising:
    a phonebook database in said mobile telephone apparatus for storing a name for each of a plurality of persons and a predetermined time interval associated with each of said plurality of persons and a last-communication time related to said name of each of said a plurality of persons, said last communication times being stored immediately after the termination of a telephone call to or from each of said plurality of persons with said mobile telephone equipment, wherein the plurality of persons is divided into at least one group; and
    a controller for determining a before-alert time interval for each of the groups, wherein the before-alert time interval is a time interval during which communication with a person in a group is not made before alerting, and continuously performing the following process:
        checking to see if at least one of said names of said plurality of persons has been registered for an alert;
        reading a current time of day from a timer;
        reading the most recently stored last-communication time for said at least one of said names;
        calculating an elapsed amount of time value that has passed since said last-communication time;
        making a determination that said elapsed amount of time value that has passed is greater than or less than said before-alert time interval based upon a comparison of the elapsed amount of time value and said before-alert time interval; and
    starting the alert function to alert the user of said mobile telephone equipment based upon the determination that said elapsed amount of time value that has passed is greater than said before-alert time interval.

17. A mobile telephone apparatus having an alert function, comprising:
    a phonebook database in said mobile telephone apparatus for storing a name of a person, a predetermined time interval associated with said person, and a last-communication time related to said name of said person immediately after the termination of a telephone call to or from said person with said mobile telephone equipment;
    an alert-inhibition timetable storing an alert-inhibition time period during which alert is inhibited; and
    a controller for continuously performing the following process:
        checking to see if said person's name has been registered for an alert;
        reading a current time of day from a timer;
        reading the most recently stored last-communication time for said person;
        calculating an elapsed amount of time value that has passed since said last-communication time;
        making a determination that said elapsed amount of time value that has passed is greater than or less than a predetermined time interval;
        alerting the user of said mobile telephone equipment based upon the determination that said elapsed amount of time value that has passed is greater than said predetermined time interval and when a current time falls out of the alert-inhibition time period , and
        inhibiting an alert when the current time falls into the alert-inhibition time period, even if it is determined that the predetermined time interval is exceeded by said elapsed amount of time value that has passed since said last-communication time.

18. An alert control method in a mobile telephone equipment having an alert function, comprising:
    registering a name of a person in a phonebook database in said mobile telephone equipment by inputting and storing a predetermined time interval associated with said person;

storing a last-communication time related to said name of said person to communicate with in a phonebook database in said mobile telephone equipment immediately after the termination of a telephone call to or from said person with said mobile telephone equipment;
continuously performing the following process:
checking to see if said person's name has been registered for an alert;
reading a current time of day from a timer;
reading the most recently stored last-communication time for said person;
calculating an elapsed amount of time value that has passed since said last-communication time;
making a determination that said elapsed amount of time value that has passed is greater than or less than said predetermined time interval based upon a comparison of the elapsed amount of time interval and said predetermined time interval; and
alerting the user of said mobile telephone equipment based upon the determination that said elapsed amount of time value that has passed is greater than said predetermined time interval.

19. The alert control method according to claim 18, wherein the time is a last-communication time at which communication with the person was made last.

20. An alert control method in a mobile telephone equipment having an alert function, comprising:
registering a name of a person in a phonebook database in said mobile telephone equipment by inputting and storing a predetermined time interval associated with said person;
storing a last-communication time data related to said name of said person to communicate with in a phonebook database in said mobile telephone equipment immediately after the termination of a telephone call to or from said person with said mobile telephone equipment;
storing an alert-inhibition time period during which alert is inhibited;
continuously performing the following process:
checking to see if said person's name has been registered for an alert;
reading a current time of day from a timer;
reading the most recently stored last-communication time for said person;
calculating an elapsed amount of time value that has passed since said last communication time;
making a determination that said elapsed amount of time value that has passed is greater than or less than said predetermined time interval based upon a comparison of the elapsed amount of time value and said predetermined time interval;
alerting the user of said mobile telephone equipment based upon the determination that said elapsed amount of time that has passed is greater than said predetermined time interval and when a current time falls out of the alert-inhibition time period ; and
inhibiting an alert when the current time falls into the alert-inhibition time period, even if it is determined that the predetermined time interval is exceeded by the elapsed amount of time value that has passed without communicating with the person.

21. The alert control method according to claim 20, wherein the time data is a last-communication time at which communication with the person was made last.

22. A mobile telephone apparatus having an alert function, comprising:
a phonebook database in said mobile telephone apparatus for storing a name of a person, a predetermined time interval associated with said person, and a last-communication time related to said name of said person immediately after the termination of a telephone call to or from said person with said mobile telephone equipment ; and
a controller for continuously performing the following process:
checking to see if said person's name has been registered for an alert;
reading a current time of day from a timer;
reading the most recently stored last-communication time for said person;
calculating an elapsed amount of time value that has passed since said last communication time;
making a determination that said elapsed amount of time value that has passed is greater than or less than a predetermined time interval; and
alerting the user of said mobile telephone equipment based upon the determination that said elapsed amount of time value that has passed is greater than said predetermined time interval.

23. A mobile telephone apparatus having an alert function, comprising:
a phonebook database in said mobile telephone apparatus for storing a name for each of a plurality of persons, a predetermined time interval associated with each of said plurality of persons, and a last-communication talk time related to said name of each of said plurality of persons immediately after a termination of a call to or from the person with said mobile telephone equipment, wherein the plurality of persons is divided into at least one group; and
a controller for determining a before-alert time interval for each of the groups, wherein the before-alert time interval is a time interval during which communication with a person in a group is not made before alerting, and for continuously performing the following process:
checking to see if said person's name has been registered for an alert;
reading a current time of day from a timer;
reading the most recently stored last-communication time for said person;
calculating an elapsed amount of time value that has passed since said last communication time;
making a determination that said elapsed amount of time value that has passed is greater than or less than a predetermined time interval; and
alerting the user of said mobile telephone equipment based upon the determination that said elapsed amount of time value that has passed is greater than said predetermined time interval.

24. A mobile telephone apparatus having an alert function, comprising:
a phonebook database in said mobile telephone apparatus for storing a name of a person, a predetermined time interval associated with said person, and a last-communication time related to said name of said person immediately after the termination of a telephone call to or from said person with said mobile telephone equipment;
an alert-inhibition timetable storing an alert-inhibition time period during which alert is inhibited; and a controller for continuously performing the following process:
  checking to see if said person's name has been registered for an alert;
  reading a current time of day from a timer;
  reading the most recently stored last-communication time for said person;
  calculating an elapsed amount of time value that has passed since said last-communication time;
making a determination that said elapsed amount of time value that has passed is greater than or less than a predetermined time interval;
  alerting the user of said mobile telephone equipment based upon the determination that said elapsed amount of time value that has passed is greater than said predetermined time interval, and when a current time falls out of the alert-inhibition time period , and
  inhibiting alerting the user when the current time falls into the alert-inhibition time period even if it is determined that said elapsed amount of time value that has passed is greater than said predetermined time interval.

25. The method of claim 1, further comprising:
  storing the predetermined time interval; and
  storing the amount of time that has elapsed since said last-communication time.

26. The method of claim 1, wherein said storing said last-communication time comprises storing a last-communication time for each of a plurality of names in said phonebook,
  wherein said calculating an amount of time comprises calculating an amount of time since said last-communication for each of said plurality of names,
  wherein said comparing comprises comparing said amount of time for at least one of said plurality of names to said predetermined time interval, and
  wherein said alerting comprising alerting when the predetermined time interval is exceed by said amount of time for at least one of said plurality of names.

27. The method of claim 26, wherein said predetermined time interval comprises the same predetermined time interval for at least two of said plurality of names.

* * * * *